UNITED STATES PATENT OFFICE.

CHARLES STEPHENS, OF NEW ORLEANS, LOUISIANA, ASSIGNOR TO HIMSELF, ROBERT HENRY STEPTOE, AND WILLIAM JULIUS STEPTOE, OF SAME PLACE.

IMPROVEMENT IN THE MANUFACTURE OF ARTIFICIAL STONE.

Specification forming part of Letters Patent No. 103,520, dated May 24, 1870.

I, CHARLES STEPHENS, of New Orleans, in the State of Louisiana, have invented a certain Improved Artificial Stone, to be used as a substitute for natural stone for all purposes to which the latter can be applied, of which the following is a specification:

The nature of the invention consists in mixing Spanish brown, cement, alum, saltpeter, French glue, sand, and water in such manner as to have the mass assume the consistency of a stiff mortar and the ingredients to be thoroughly intermingled with each other, and then pressing the same, by means of proper machinery and suitable molds, into any desired form.

To prepare a block of stone weighing eleven pounds and a half, or thereabout, take of Spanish brown in solution, two ounces; of cement, four ounces; of alum in solution, one ounce; of saltpeter in solution, half an ounce; of French glue in solution, one ounce; of sand, ten pounds; and of water, enough to reduce the mass to the consistency of a stiff mortar after a thorough admixture and combination of the several ingredients. Put the admixture in molds of any desired form or configuration, and compress it powerfully by any proper mechanical power, and twenty-four hours afterward it is ready for use.

The same proportions of the ingredients are employed, whatever the weight of the stone or stones or the volume of mortar prepared to make the same may be.

My compound equally resists the effects of water and the action of fire, for it cannot be dissolved by the former nor melted by the latter at any degree of heat which will not melt sand or pure silex. It is therefore especially adapted to building purposes, for the making of pavements in cities, and for road-beds for city railroads, and all similar objects. It can be produced cheaper than ordinary bricks, since it requires no burning, and may be molded into any conceivable form and of any size occasion may require.

I claim as my invention—

The manufacture or preparation of a compound, to wit, an artificial stone, of the ingredients, in the proportions, and for the purposes set forth.

CHARLES STEPHENS.

Witnesses:
 RUFUS R. RHODES,
 H. N. JENKINS.